United States Patent
Chang

(10) Patent No.: US 7,845,811 B2
(45) Date of Patent: *Dec. 7, 2010

(54) PRISM SHEET AND LIQUID CRYSTAL DISPLAY DEVICE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/957,490

(22) Filed: Dec. 17, 2007

(65) Prior Publication Data

US 2009/0040425 A1 Feb. 12, 2009

(30) Foreign Application Priority Data

Aug. 7, 2007 (CN) .................... 2007 1 0201294

(51) Int. Cl.
*G09F 13/04* (2006.01)
*G09F 13/08* (2006.01)

(52) U.S. Cl. .................. 362/97.2; 362/620; 362/626

(58) Field of Classification Search .......... 362/97, 362/330–331, 620, 626; 359/619; 349/61–63, 349/66

See application file for complete search history.

(56) References Cited

U.S. PATENT DOCUMENTS

| 6,752,505 B2 * | 6/2004 | Parker et al. ............... 362/627 |
| 2006/0239029 A1 | 10/2006 | Yu |
| 2006/0256582 A1 | 11/2006 | Chuang |

FOREIGN PATENT DOCUMENTS

| CN | 1716027 A | 1/2006 |
| WO | WO2005003851 | 1/2005 |

* cited by examiner

*Primary Examiner*—Jason M Han
(74) *Attorney, Agent, or Firm*—Frank R. Niranjan

(57) ABSTRACT

An exemplary prism sheet (20) includes a light input surface (201), a light output surface (202) opposite to the light input surface, and a plurality of micro-depressions (205). The plurality of micro-depressions are defined in the light output surface and arranged in a skewed matrix. Each micro-depression has four side surfaces connected to each other, and a transverse width of each side surface decreases along a direction away from the light output surface and close to the light input surface. The present invention also provides a liquid crystal display device (200) using the above-described prism sheet.

12 Claims, 6 Drawing Sheets

PRISM SHEET AND LIQUID CRYSTAL DISPLAY DEVICE USING THE SAME

CROSS-REFERENCE TO RELATED APPLICATIONS

This application is related to seven co-pending U.S. patent applications, which are: application Ser. No. 11/933,439 and Ser. No. 11/933,441, filed on Nov. 1, 2007, and both entitled "PRISM SHEET AND LIQUID CRYSTAL DISPLAY DEVICE USING THE SAME", application Ser. No. 11/946,860 and Ser. No. 11/946,862, filed on Nov. 29, 2007, and both entitled "PRISM SHEET AND LIQUID CRYSTAL DISPLAY DEVICE USING THE SAME", application Ser. No. 11/949,056, filed on Dec. 3, 2007, and entitled "PRISM SHEET AND LIQUID CRYSTAL DISPLAY DEVICE USING THE SAME", application Ser. No. 11/949,057, filed on Dec. 3, 2007, entitled "PRISM SHEET AND BACKLIGHT MODULE USING THE SAME", application Ser. No. 11/957,489, and entitled "PRISM SHEET AND LIQUID CRYSTAL DISPLAY DEVICE USING THE SAME", and application Ser. No. 11/957,491, and entitled "PRISM SHEET AND BACKLIGHT MODULE USING THE SAME". In all these co-pending applications, the inventor is Shao-Han Chang. All of the co-pending applications have the same assignee as the present application.

BACKGROUND OF THE INVENTION

1. Field of the Invention

The present invention generally relates to prism sheets and liquid crystal display devices using the prism sheet.

2. Discussion of the Related Art

FIG. 6 represents a typical liquid crystal display device 100. The liquid crystal display device 100 includes a housing 11 and a plurality of lamps 12 are above a base of the housing 11. The liquid crystal display device 100 further includes a light diffusion plate 13, a prism sheet 10, and a liquid crystal display panel 15 stacked on the housing 11 in that order. An interior of the housing 11 is configured for reflecting light towards the light diffusion plate 13. The light diffusion plate 13 includes a plurality of dispersion particles. The dispersion particles are configured for scattering light, and thereby enhancing the uniformity of the received light emitting from the light diffusion plate 13.

The prism sheet 10 includes a base layer 101 and a prism layer 102 formed on the base layer 101. The prism layer 102 has a plurality of V-shaped protrusion 103. Each V-shaped protrusion 103 extends along a direction parallel to one edge of the prism sheet 20. The plurality of V-shaped protrusions 103 are regularly and periodically arranged parallel to each other. Typically, a method of manufacturing the prism sheet 10 includes following steps. Firstly, a melted ultraviolet-cured transparent resin is coated on the base layer 101, then the melted ultraviolet-cured transparent resin is solidified to form the prism layer 102.

In use, light emitted from the lamps 12 enters the prism sheet 10 after scattered in the diffusion plate 13. The light is refracted by the V-shaped protrusions 103 of the prism sheet 10 and is thereby concentrated, so that a brightness of light illumination is increased. Finally, the light propagates into an LCD panel 15 disposed above the prism sheet 10.

However, it is prone to occur moire pattern interference effect on the LCD panel 15 due to the V-shaped structures 102 are aligned similarly to the LCD pixels. In order to decrease the moire pattern interference effect, the liquid crystal display device 100 should further include an upper light diffusion film 14 inserted between the prism sheet 10 and the LCD panel 15. Although the upper light diffusion film 14 and the prism sheet 10 are in contact with each other, a plurality of air pockets still exist at the boundary therebetween. When the liquid crystal display device 100 is in use, light passes through the air pockets, and some of the light undergoes total reflection at one or another of the corresponding boundary. In addition, an amount of light is absorbed by the upper light diffusion film 14. As a result, a light brightness of the liquid crystal display device 100 is reduced.

What is needed, therefore, is a new prism sheet and a liquid crystal display device using the prism sheet that can overcome the above-mentioned shortcomings.

SUMMARY

An exemplary prism sheet includes a light input surface, a light output surface opposite to the light input surface, and a plurality of micro-depressions. The plurality of micro-depressions are defined on the light output surface and arranged in a skewed matrix. Each micro-depression has four side surfaces connected to each other. A transverse width of each side surface decreases along a direction away from the light output surface and close to the light input surface.

An exemplary liquid crystal display device includes a housing, at least one light source disposed in the housing, a diffusion plate disposed above the housing, a prism sheet and a liquid crystal display panel. The prism sheet is disposed above the diffusion plate. The liquid crystal display panel is disposed above the prism sheet. The prism sheet includes a light input surface, a light output surface opposite to the light input surface, and a plurality of micro-depressions. The plurality of micro-depressions are defined on the light output surface and arranged in a skewed matrix. Each micro-depression has four side surfaces connected to each other. A transverse width of each side surface decreases along a direction away from the light output surface and close to the light input surface.

Other advantages and novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating principles of the present prism sheet and liquid crystal display device. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present prism sheet and liquid crystal display device, in detail.

Figure 1:
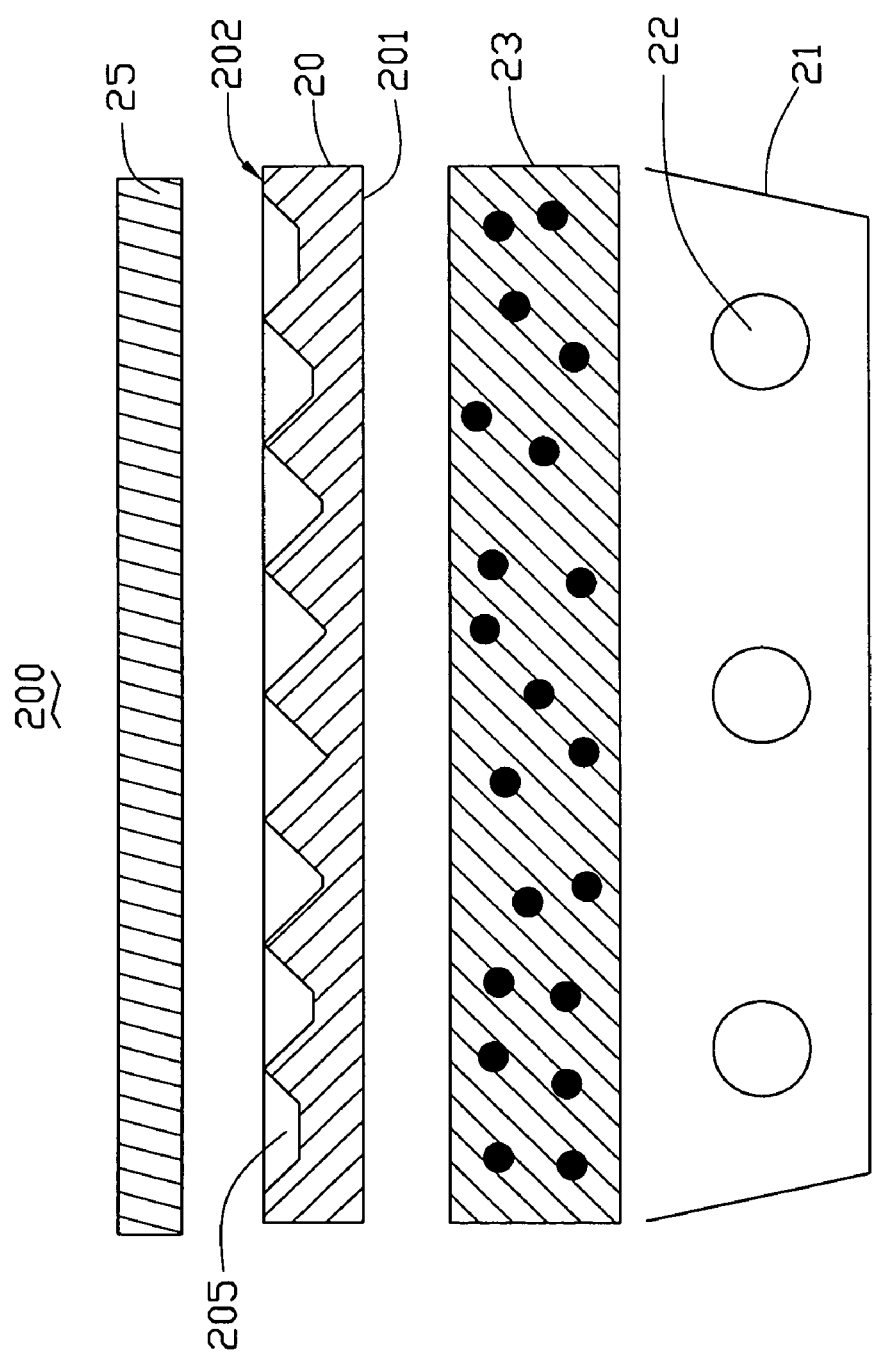
FIG. 1 is an exploded, side cross-sectional view of a liquid crystal display device according to a first embodiment of the present invention.

Referring to FIG. 1, a liquid crystal display device 200 according to a first embodiment of the present invention is shown. The liquid crystal display device 200 includes a housing 21, a plurality of light sources 22, a diffusion plate 23, a prism sheet 20, and a liquid crystal display panel 25. The plurality of light sources 22 are disposed in the housing 21. The diffusion plate 23, the prism sheet 20 and the liquid crystal display panel 25 are stacked on the housing 21 in that order. An interior of the housing 21 is configured for reflecting light from the light sources 22 upwards. The light diffusion plate 23 is configured for scattering light.

Figure 2:
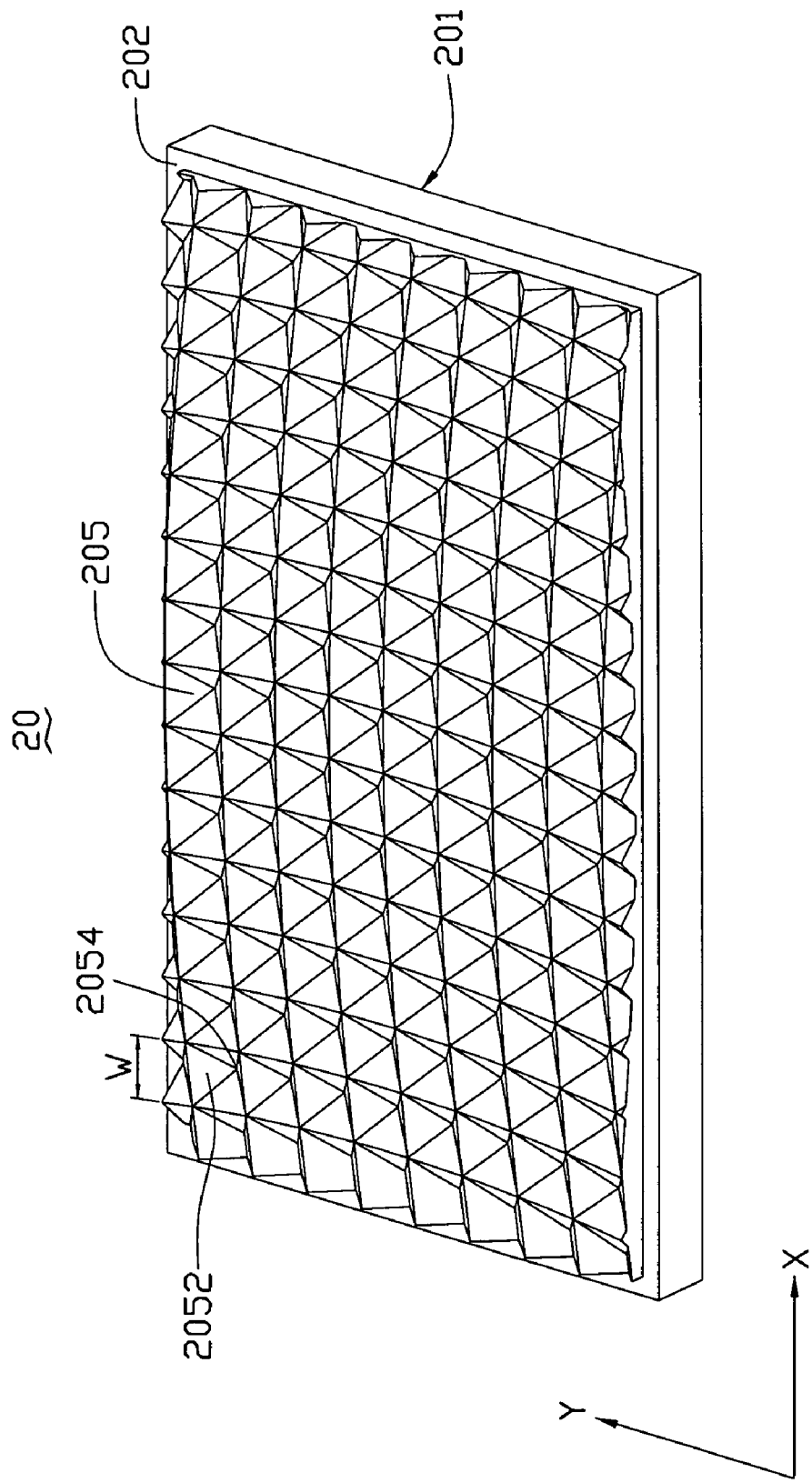
FIG. 2 is an isometric view of a prism sheet of the liquid crystal display device of FIG. 1.
Figure 3:
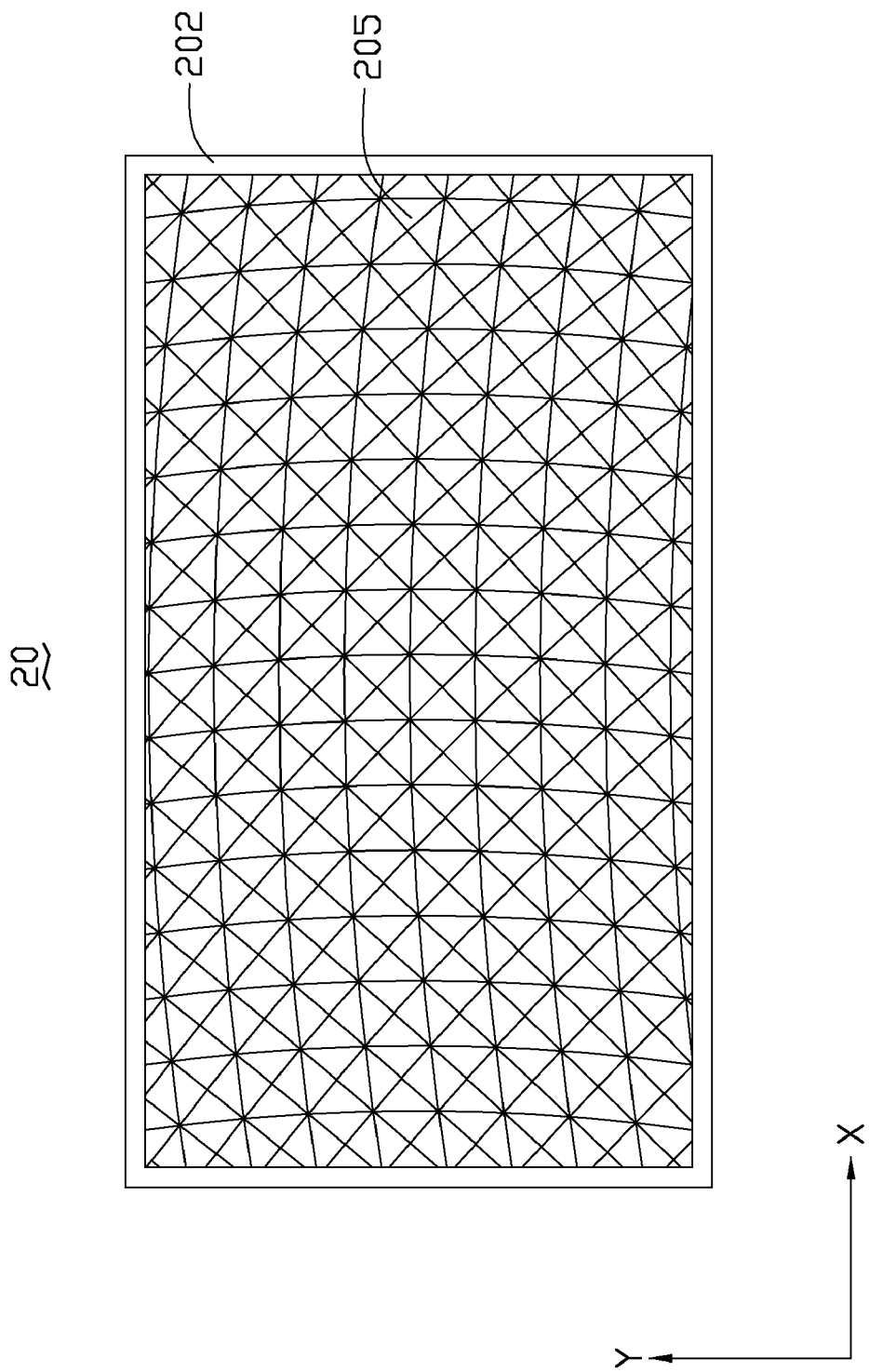
FIG. 3 is a top plan view of the prism sheet of FIG. 2.

Also referring to FIG. 2 and FIG. 3, the prism sheet 20 includes a light input surface 201 and a light output surface 202. The light input surface 201 and the light output surface 202 are on opposite sides of the prism sheet 20. The light input surface 201 faces the diffusion plate 23. The light output surface 202 faces the liquid crystal display panel 25. A plurality of micro-depressions 205 are defined in the prism sheet 20 at the light output surface 202.

Each row of the micro-depressions 205 extends along a circular arc. The circular arcs have a same curvature, and are aligned parallel to each other. Each of the micro-depressions 205, is formed according to a skewed matrix, thus a size, a shape, and a position of each of the micro-depressions 205 correspond to rows and columns of the skewed matrix. That is each micro-depression 205 has a shape that follows a contour of the skewed matrix. In the first embodiment, the micro-depressions 205 have a same shape and a same size. Furthermore, as seen in FIG. 2, each row and each column of the matrix are curved. In the first embodiment, curvatures of the rows of the matrix are the same.

The micro-depressions 205 are configured for collimating light exiting the optical plate 20, thereby improving the brightness of light illumination. In the first embodiment, each micro-depression 205 includes four side surfaces 2052 intersecting at a vertex point 2054. That is, the micro-depressions 205 are inverted rectangular pyramidal depressions. A transverse width "W" of each side surface 2052 increases along a direction away from the light input surface 201 to the vertex point 2054 of each micro-depressions 205. A pitch between adjacent micro-depressions 205 either in the X-direction or a Y-direction, is configured to be in a range from about 0.025 millimeters to about 1 millimeter. A dihedral angle, defined by opposite side surfaces 2052 of each micro-depression 205 is configured to be in the range from about 60 degrees to about 120 degrees. The dihedral angle, defined by two opposite side surfaces 2052 may be the same to or different from the dihedral angle defined by two other side surfaces 2052 of each second micro-depression 205.

The prism sheet 20 is made of one or more transparent matrix resins selected from a group including polyacrylic acid (PAA), polycarbonate (PC), polystyrene (PS), polymethyl methacrylate (PMMA), methylmethacrylate and styrene (MS), and so on. A thickness of the prism sheet 20 is in a range from about 0.5 millimeters to about 3 millimeters.

The housing 21 is used to reflect light emitted from the light sources 22 towards the diffusion plate 23. The interior of the housing 21 is configured to be highly reflective.

The light sources 22 can be either point light sources, such as light emitting diodes, or linear light sources, such as cold cathode fluorescent lamps.

The diffusion plate 23 is configured for enhancing optical uniformity of the liquid crystal display device 200.

Light from the light sources 22 enters the diffusion plate 23 directly or after reflecting off the housing 21 and becomes scattered by the diffusion plate 23. Scattered light then exits the diffusion sheet 23 to the prism sheet 20. The scattered light is condensed to a certain degree when entering the prism sheet 20 at the light input surface 201 by the micro-depressions 205, and then is further condensed when exiting the light output surface 202 of the prism sheet 20. Thereby, a brightness of light illumination of the liquid crystal display device 200 can be definitely enhanced. Furthermore, since the micro-depressions 205 extend along curved lines, such as, arcs, an arrangement of the micro-depressions 205 is different from that of pixels of the liquid crystal display panel 25. Thus moire pattern interference effect between the prism sheet 20 with the pixel pitch of the liquid crystal display panel 25 is decreased or even eliminated.

In an alternative embodiment, the micro-depressions 205 can be arranged along a plurality of separate circular arcs of circles having a same radius. However, centers of the circles defined by the circular arcs are aligned in a straight line along the Y-direction. Preferably, the centers are arranged apart in a constant distance to design two adjacent arrays of the micro-depressions 205 aligned side by side.

Figure 4:
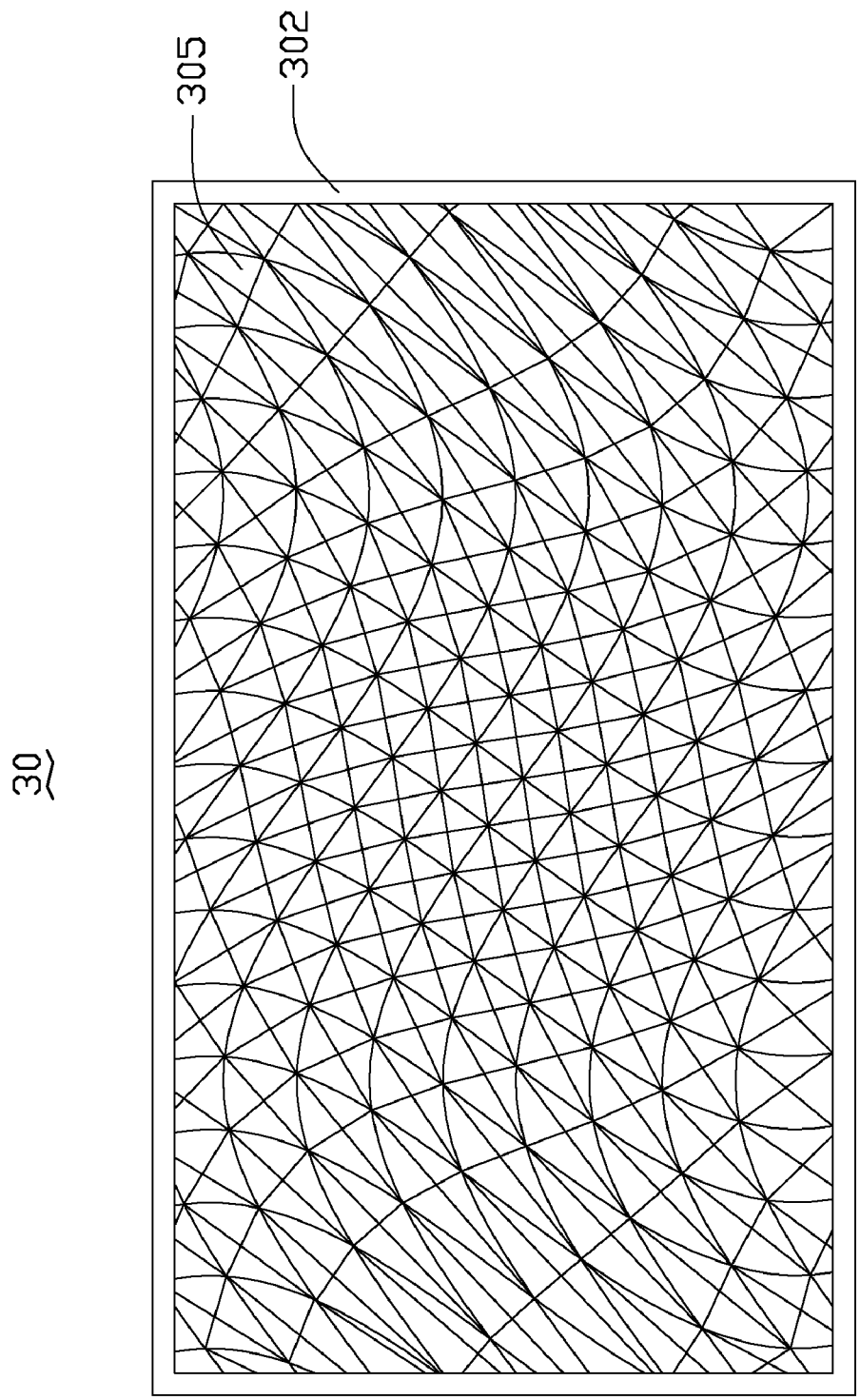
FIG. 4 is a top plan view of a prism sheet according to a second embodiment of the present invention.

Referring to FIG. 4, an optical plate 30 in accordance with a second preferred embodiment is shown. The optical plate 30 is similar in principle to the optical plate 20. The micro-depressions 305 of the optical plate 30 are arranged in a skewed matrix having rows and columns. However, either each row or each column of the micro-depressions 305 extends along a predetermined S-shaped curve. The micro-depressions 305 are defined in a light output surface 302. Each micro-depression 305 has a shape that follows a contour of the skewed matrix.

Figure 5:
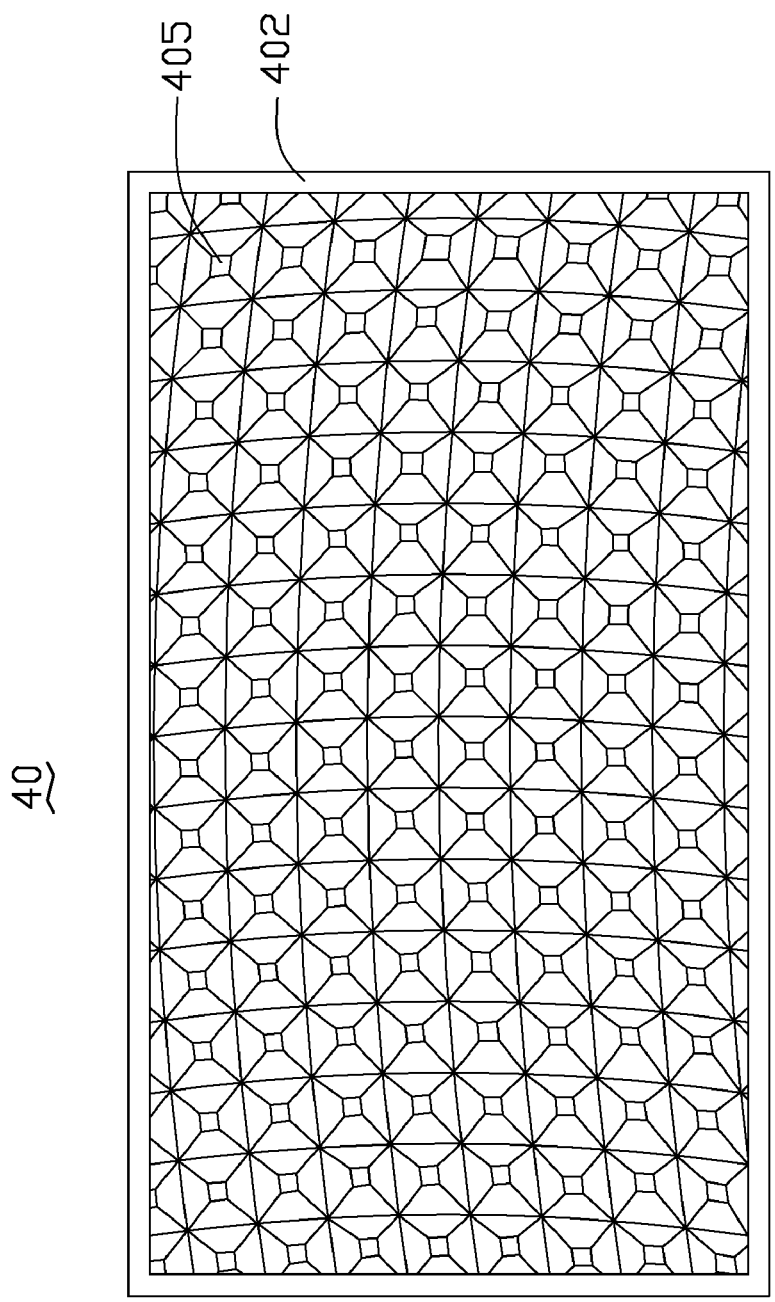
FIG. 5 is a top plan view of a prism sheet according to a third embodiment of the present invention.
Figure 6:
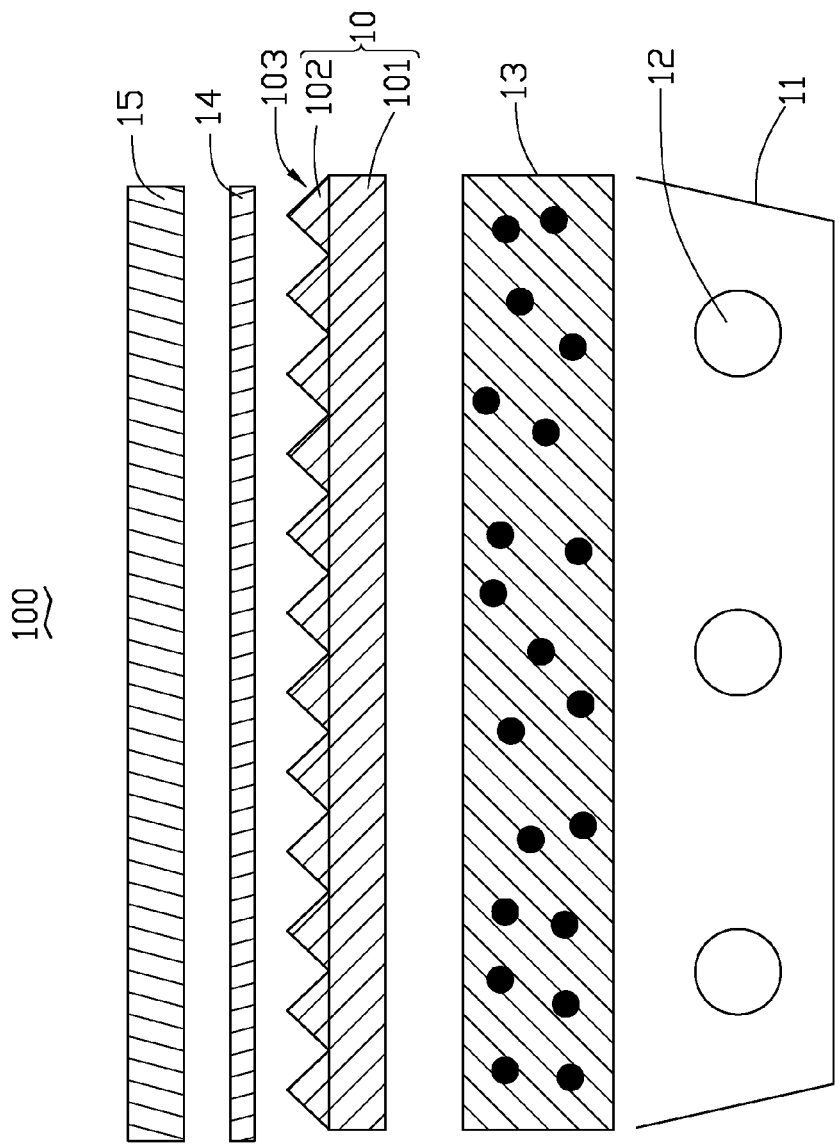
FIG. 6 is an exploded, side cross-sectional view of a conventional liquid crystal display device.

Referring to FIG. 5, an optical plate 40 in accordance with a third preferred embodiment is shown. The optical plate 40 is similar in principle to the optical plate 20 of the first embodiment. However, each of micro-depressions 405 of the optical plate 40 has a configuration of a frustum of a four-sided pyramid-like structure. The micro-depression 405 includes four side surfaces (not labeled) and a bottom surface (not labeled). The micro-depressions 405 are defined in a light output surface 402.

It should be noted that the scope of the present optical plate is not limited to the above-described embodiments. In particular, even though specific shapes of micro-depressions have been described and illustrated, the micro-depressions can have various other suitable shapes. For example, the micro-depressions can be three-sided (triangular) pyramidal depressions, four-sided (rectangular) pyramidal depressions, five-sided (pentagonal) pyramidal depressions, multi-sided (polygonal) pyramidal depressions, or frustums of these.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A prism sheet for a direct backlight, comprising:
a light input surface;
a light output surface opposite to the light input surface; and
a plurality of micro-depressions arranged and aligned in a skewed matrix, the skewed matrix comprising rows and columns, the rows forming a plurality of first circular arcs having a predetermined S-shaped curvature, and the columns forming a plurality of second circular arcs having a predetermined S-shaped curvature, the prism sheet defining the plurality of micro-depressions in the light output surface, wherein each micro-depression has four side surfaces connected to each other, and a transverse width of each side surface decreases along a direction away from the light output surface and close to the light input surface; each micro-depression has a shape that follows a contour defined by the rows and columns of the skewed matrix, a pair of side surfaces of each micro-depression being formed along the first circular arc and the other pair of side surfaces of each micro-depression being formed along the second circular arc; the first circular arcs are smooth, continuous, and coplanar with the light output surface, and the second circular arcs are smooth, continuous, and coplanar with the light output surface.

2. The prism sheet as claimed in claim 1, wherein a pitch of adjacent two micro-depressions is in a range from about 0.025 millimeters to about 1 millimeter.

3. The prism sheet as claimed in claim 1, wherein the micro-depressions are shaped in four-sided pyramidal depressions.

4. The prism sheet as claimed in claim 3, wherein for each four-sided pyramidal depression, a first pair of opposite sides defines a first dihedral angle, a second pair of opposite sides defines a second dihedral angle, and each of the first and second dihedral angles is in the range from about 60 degrees to about 120 degrees.

5. The prism sheet as claimed in claim 1, wherein a thickness of the prism sheet is in a range from about 0.5 millimeters to about 3 millimeters.

6. The prism sheet as claimed in claim 1, wherein the prism sheet is made of one or more transparent matrix resins selected from the group consisting of polyacrylic acid, polycarbonate, polystyrene, polymethyl methacrylate, methylmethacrylate and styrene.

7. A liquid crystal display device comprising:
a housing;
at least one light source disposed in the housing;
a diffusion plate disposed above the housing;
a prism sheet disposed about the diffusion plate, the prism sheet having a light input surface, a light output surface opposite to the light input surface, and a plurality of micro-depressions, the plurality of micro-depressions arranged and aligned in a skewed matrix, the skewed matrix comprising rows and columns, the rows forming a plurality of first circular arcs having a predetermined S-shaped curvature, and the columns forming a plurality of second circular arcs having a predetermined S-shaped curvature, the prism sheet defining the plurality of micro-depressions in the light output surface, wherein each micro-depression has four side surfaces connected to each other, and a transverse width of each side surface decreases along a direction away from the light output surface and close to the light input surface; each micro-depression has a shape that follows a contour defined by the rows and columns of the skewed matrix, a pair of side surfaces of each micro-depression being formed along the first circular arc and the other pair of side surfaces of each micro-depression being formed along the second circular arc; the first circular arcs are smooth, continuous, and coplanar with the light output surface, and the second circular arcs are smooth, continuous, and coplanar with the light output surface; and
a liquid crystal display panel disposed above the prism sheet.

8. The liquid crystal display device as claimed in claim 7, wherein the interior of the housing is configured to be highly reflective.

9. The prism sheet as claimed in claim 7, wherein a pitch of adjacent two micro-depressions is in a range from about 0.025 millimeters to about 1 millimeter.

10. The prism sheet as claimed in claim 7, wherein a thickness of the prism sheet is in a range from about 0.5 millimeters to about 3 millimeters.

11. The prism sheet as claimed in claim 7, wherein the prism sheet is made of one or more transparent matrix resins selected from the group consisting of polyacrylic acid, polycarbonate, polystyrene, polymethyl methacrylate, methylmethacrylate and styrene.

12. A prism sheet for a direct backlight, comprising:
a light input surface;
a light output surface opposite to the light input surface; and
a plurality of micro-depressions formed on the light output surface and arranged and aligned in a skewed matrix, the skewed matrix comprising rows and columns, the rows forming a plurality of first predetermined S-shaped curves, and the columns forming a plurality of a second predetermined S-shaped curves, wherein each micro-depressions includes four side surfaces connected to each other, a transverse width of each side surface decreases along a direction away from the light output surface; each micro-depressions has a shape that follows a contour defined by the rows and columns of the skewed matrix, a pair of side surfaces of each micro-depressions extends along the first predetermined S-shaped curves and the other pair of side surfaces of each micro-depressions extends along the second predetermined S-shaped curves; the first predetermined S-shaped curves are smooth, continuous, and coplanar with the light output surface, and the second predetermined S-shaped curves are smooth, continuous, and coplanar with the light output surface.

* * * * *